United States Patent
Ito

(10) Patent No.: US 9,220,383 B2
(45) Date of Patent: Dec. 29, 2015

(54) COLLAPSIBLE TOILET

(71) Applicant: Hiroshi Ito, Tokyo (JP)

(72) Inventor: Hiroshi Ito, Tokyo (JP)

( * ) Notice: Subject to any disclaimer, the term of this patent is extended or adjusted under 35 U.S.C. 154(b) by 329 days.

(21) Appl. No.: 13/863,648

(22) Filed: Apr. 16, 2013

(65) Prior Publication Data

US 2013/0227776 A1  Sep. 5, 2013

Related U.S. Application Data

(63) Continuation of application No. PCT/JP2012/060966, filed on Apr. 24, 2012.

(30) Foreign Application Priority Data

| Jun. 28, 2011 | (JP) | 2011-142570 |
| Jul. 11, 2011 | (JP) | 2011-153199 |
| Sep. 2, 2011 | (JP) | 2011-191853 |

(51) Int. Cl.
| A47K 11/02 | (2006.01) |
| A47K 11/04 | (2006.01) |
| A47K 11/06 | (2006.01) |

(52) U.S. Cl.
CPC ............... *A47K 11/02* (2013.01); *A47K 11/04* (2013.01); *A47K 11/06* (2013.01)

(58) Field of Classification Search
CPC ....................................................... A47K 11/06
USPC ............................................................ 4/479, 483
See application file for complete search history.

(56) References Cited

U.S. PATENT DOCUMENTS

2009/0172872 A1* 7/2009 Macey et al. ............... 4/451

FOREIGN PATENT DOCUMENTS

| JP | A-10-192189 | 7/1998 |
| WO | 2006/090178 A1 | 8/2006 |

OTHER PUBLICATIONS

Feb. 16, 2015 Supplementary Search Report issued in European Application No. 12 80 5333.

* cited by examiner

*Primary Examiner* — Janie Christiansen
(74) *Attorney, Agent, or Firm* — Oliff PLC

(57) ABSTRACT

A collapsible toilet in which waste of materials used is minimized and which is simple in structure, has a predetermined strength, and can be used repeatedly is provided. A collapsible toilet made from a rectangular board demarcated into five rows×three columns of rectangular segments by foldable division lines or perforation lines, the rectangular board being shaped into a rectangular parallelepiped when assembled, includes a first row section that forms a first side face, a second row section that forms a top face, a third row section that forms a third side face, a fourth row section that forms at least a second side face, a fourth side face, and a bottom face, and a fifth row section that forms a first reinforcing portion for the top face, a second reinforcing portion for the top face, and the first side face.

5 Claims, 15 Drawing Sheets

COLLAPSIBLE TOILET

CROSS REFERENCE TO RELATED APPLICATION

This is a Continuation of International Application No. PCT/JP2012/060966 filed Apr. 24, 2012, which claims the benefit of Japanese Applications No. 2011-142570 filed Jun. 28, 2011, No. 2011-153199 filed Jul. 11, 2011, and No. 2011-191853 filed Sep. 2, 2011. The disclosure of the prior applications are hereby incorporated by reference herein in their entirety.

TECHNICAL FIELD

The present invention relates to a collapsible portable toilet.

BACKGROUND ART

In the event of an emergency such as an earthquake and a typhoon, a number of local residents are often obliged to live together in an evacuation center, etc. In such a case, disposal of excrement is an unavoidable problem. In such an emergency, procurement of a large number of small-sized mobile toilets is often difficult from the standpoints of cost, transportation, etc. Even if this is successful, an installation site having a given area is necessary. To overcome this problem, there has been proposed a collapsible toilet (collapsible arched portable toilet) that can be prepared in advance and poses few limitations on the installation site. As shown in FIGS. 14 and 15, a portable toilet S is made of cardboard having a plurality of division lines (fold formation lines) given in advance, and can be formed into an arch shape by folding the board along the division lines in a predetermined order (Patent Document 1).

CITATION LIST

Patent Literature

[PLT1] JP 1110-192189A

SUMMARY OF INVENTION

Technical Problem

However, while a portable toilet must have a structure capable of withstanding a predetermined weight if it is intended to be used repeatedly by male adults, etc., the conventional portable toilet S has a problem that the strength of side middle portions 90 is weak.

The conventional toilet S also has a problem that, since it is formed to have an arch shape when assembled, the manufacture thereof is complicated, and also there is a waste of materials used, resulting in cost increase.

Solution to Problem

It is an objective of the present invention to provide a collapsible toilet in which waste of materials used is minimized and which is simple in structure, has a predetermined strength, and can be used repeatedly.

The collapsible toilet of the present invention is a collapsible toilet made from a rectangular board demarcated into five rows×three columns of rectangular segments by foldable division lines or perforation lines, segments constituting each row being equal in vertical length (although segments in different rows may be different in vertical length) and segments constituting each column being equal in lateral length, the segments being formed to be bilaterally symmetric with respect to a line perpendicular to a row direction as a symmetry axis, the rectangular board being shaped into a rectangular parallelepiped when assembled, the toilet comprising: a first row section that forms a first side face; a second row section that is adjacent to the first row section and forms a top face; a third row section that is adjacent to the second row section and forms a third side face opposite to the first side face; a fourth row section that is adjacent to the third row section and forms at least a second side face, a fourth side face opposite to the second side face, and a bottom face; and a fifth row section that is adjacent to the fourth row section and forms a first reinforcing portion for the top face, a second reinforcing portion for the top face, and the first side face, wherein an opening is formed in the top face, and during the assembly, the first reinforcing portion and the second reinforcing portion are each formed into a wave-shape portion by a plurality of division lines orthogonal to the row direction, and the first reinforcing portion and the second reinforcing portion can be placed along the second side face and the four side face, respectively, over the entire areas of the respective side faces.

Alternatively, the collapsible toilet of the present invention is a collapsible toilet made from a rectangular board demarcated into five rows×three columns of rectangular segments by foldable division lines or perforation lines, segments constituting each row being equal in vertical length (although segments in different rows may be different in vertical length) and segments constituting each column being equal in lateral length, the basic shape of the segments (the manner in which the division lines are drawn is not necessarily bilaterally symmetric in some cases) being formed to be bilaterally symmetric with respect to a line perpendicular to a row direction as a symmetry axis, the rectangular board being shaped into a rectangular parallelepiped when assembled, the toilet comprising: a first row section that forms a first side face and a third reinforcing portion for a top face; a second row section that is adjacent to the first row section and forms the top face and the third reinforcing portion for the top face; a third row section that is adjacent to the second row section and forms a third side face opposite to the first side face; a fourth row section that is adjacent to the third row section and forms at least a second side face, a fourth side face opposite to the second side face, and a bottom face; and a fifth row section that is adjacent to the fourth row section and forms a first reinforcing portion for the top face, a second reinforcing portion for the top face, and the first side face, wherein an opening is formed in the top face, during the assembly, the first reinforcing portion and the second reinforcing portion are each formed into a wave-shape portion by a plurality of division lines orthogonal to the row direction, and the first reinforcing portion and the second reinforcing portion can be placed along the second side face and the fourth side face, respectively, over portions of at least a half or more of the side length of the second side face and the fourth side face, and the third reinforcing portion is configured to form a tubular portion or a U-shape portion with its opening facing downward as viewed from the side with one division line or a plurality of division lines in the row direction, and can be placed along the third side face.

As used herein, the rectangular shape refers to a tetragonal shape (including a square) as viewed from the top. Note that even a rectangular shape having a cut and/or a gap partly formed for the purpose of intentionally avoiding falling within the scope of the present invention or any other purpose is to be included in the scope of the protection of the present invention as long as it has the same effects.

The rectangular parallelepiped also includes a cube.

The board may be made of any material including paper such as cardboard and reinforced paper, plastic, etc. as long as it is foldable.

The wave-shape portions of the first reinforcing portion and the second reinforcing portion may have any shape and form as long as they are placed along a portion of at least a half or more of the side length of the second side face or the fourth side face.

When the third reinforcing portion is configured to form a tubular portion as viewed from the side, the tube may have any form including its shape (it may be a pipe-like body): e.g., the wall thereof may be partly doubled.

Also, the U-shape portion with its opening facing downward as viewed from the side is provided for the purpose of imparting rigidity to the U-shape portion by forming a downward opening. Therefore, it is only necessary to form a U-shape portion somewhere in the third reinforcing portion.

While the fourth row section is only required to constitute at least the second side face, the fourth side face, and the bottom face, it can also form another face (e.g., the top face).

Moreover, each row section may be cut apart from its adjacent row section at any position as long as it is joined with at least one of its adjacent row sections (e.g., the first row section, which has the possibility of being joined with the second row section and the fifth row section, may be joined with either one of them or both of them).

It is preferable to configure the toilet of the present invention so that a bag for covering the inside space of the toilet can be inserted through the opening, to permit easy disposal of excrement. In this case, it is more preferable if the inside of the bag can be filled with excrement treatment materials (including a water absorbing material, a deodorant, a sterilization agent, etc.) in the form of granules and powder.

According to the present invention, the right fifth segment and the left fifth segment have wave-shape portions. Therefore, even though the material is a thin board, a predetermined strength can be maintained. Also, since the wave-shape portions are placed along the second side face and the fourth side face over portions of at least a half or more of the side length of the second side face and the fourth side face, the portions of the top face on the second side face side and on the fourth side face side on which a load is to be mounted are supported from below, and thus can be effectively reinforced.

Also, according to the present invention, when the third reinforcing portion in a tubular shape or a U shape with its opening facing downward as viewed from the side is placed along the third side face, the portion of the top face on the third side face side that is lowest in strength on the top face on which a load is to be mounted can be supported from below, and thus can be effectively reinforced.

Moreover, according to the present invention, since the toilet is formed of a rectangular board, waste of the raw material can be effectively prevented, and thus the toilet can be manufactured at low cost.

Alternatively, the collapsible toilet of the present invention is a collapsible toilet made from a rectangular board that is demarcated into five rows×three columns of rectangular segments by foldable division lines or perforation lines and shaped into a rectangular parallelepiped when assembled, the toilet comprising: a first row section that forms a first side face and a third reinforcing portion for a top face; a second row section that is adjacent to the first row section and forms the top face and the third reinforcing portion for the top face; a third row section that is adjacent to the second row section and forms a third side face opposite to the first side face; a fourth row section that is adjacent to the third row section and forms at least a second side face, a fourth side face opposite to the second side face, and a bottom face; and a fifth row section that is adjacent to the fourth row section and forms a first reinforcing portion for the top face, a second reinforcing portion for the top face, and the first side face, wherein an opening is formed in the top face, the first reinforcing portion includes, during the assembly, a first side face near portion that is demarcated by a plurality of division lines orthogonal to the row direction and can be placed at a position near the first side face by one division line or a plurality of division lines in the row direction, and a second side face parallel portion that can be placed along the second side face over a portion of at least a half or more of the side length of the second side face, the second reinforcing portion includes, during assembly, a first side face near portion that is demarcated by a plurality of division lines orthogonal to the row direction and can be placed at a position near the first side face by one division line or a plurality of division lines in the row direction, and a fourth side face parallel portion that can be placed along the fourth side face over a portion of at least a half or more of the side length of the fourth side face, and the third reinforcing portion is configured to form a tubular portion or a U-shape portion with its opening facing downward as viewed from the side with one division line or a plurality of division lines in the row direction, and is placed along the third side face.

The first side face near portion has no limitation on its length and may be folded back a plurality of times as long as it extends side by side (more preferably, roughly in parallel) with the first side face at a position near the first side face.

The second side face parallel portion or the fourth side face parallel portion may have a linear shape or a wave shape whichever is acceptable as long as it extends side by side (more preferably, roughly in parallel) with the second side face or the fourth side face.

According to the present invention, the right fifth segment and the left fifth segment include the first side face near portions and the second side face parallel portion and the fourth side face parallel portion, respectively.

The first side face near portions are placed at positions near the first side face to extend side by side with the first side face. Therefore, the portion of the top face on the first side face side on which a load is to be mounted is supported from below, and thus can be effectively reinforced.

Also, with the second side face parallel portion and the fourth side face parallel portion, the portions of the top face on the second side face side and the fourth side face side on which a load is to be mounted are supported from below, and thus can be effectively reinforced.

In the collapsible toilet of the present invention, the second row section may be formed of a center second segment and a right second segment and a left second segment placed with the center second segment interposed therebetween, at least one of the right second segment and the left second segment and the center second segment may be folded along a predetermined segment line and laid on top of each other, thereby forming the top face, and the one of the right second segment and the left second segment, and the center second segment may have respective openings, and the openings may be in communication with each other.

According to the present invention, since one of the right and left second segments and the center second segment have respective openings and the openings are in communication with each other, the opening can be easily provided.

In the collapsible toilet of the present invention, at least one of at least two openings in the second row section may have foldable movement blocking pieces for the first reinforcing portion and the second reinforcing portion.

Either one, two or more, or all of the at least two openings in the second row section may have movement blocking pieces, and the shape of the pieces is not limited.

According to the present invention, the first reinforcing portion and the second reinforcing portion can be easily positioned by folding the movement blocking pieces for the first and second reinforcing portions of each opening toward the bottom face. Therefore, the strength can be secured with a simple means.

In the collapsible toilet of the present invention, at least one of at least two openings in the second row section may have foldable bag catch pieces.

Either one, two or more, or all of the at least two openings in the second row section may have bag catch pieces, and the shape of the pieces is not limited.

According to the present invention, since the bag catch pieces are formed for at least one of the openings, it is possible to fold the bag catch pieces back to allow them to catch the open edge of a bag for receiving excrement.

Advantageous Effects of Invention

According to the present invention, it is possible to provide a collapsible toilet in which waste of materials used is minimized and which is simple in structure, has a predetermined strength, and can be used repeatedly.

DESCRIPTION OF EMBODIMENTS

Figure 1:
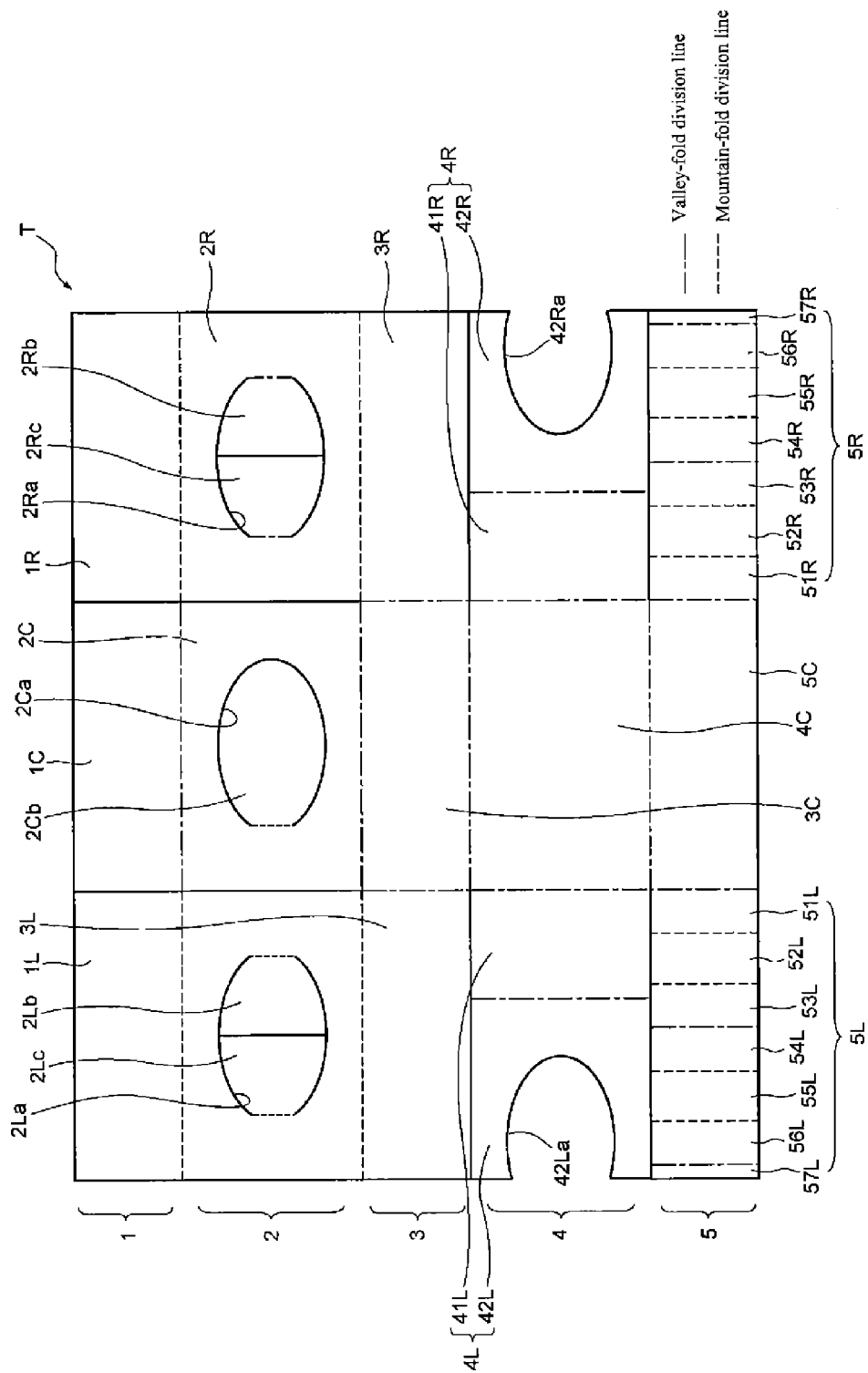
FIG. 1 is a development view of a collapsible toilet (first embodiment) of the present invention.

A form (hereinafter referred to as an embodiment) for realizing a collapsible toilet T of the present invention (hereinafter referred to as the present toilet) will be described in detail with reference to the drawings. Note that, in the following description, the same members, elements, etc. are denoted by the same reference characters, and duplication of description is avoided.

First Embodiment

1. Configuration of Toilet T Before Assembly

A first embodiment of the present toilet T before assembly is made of cardboard, and is formed to be a rectangular board (FIG. 1) during storage in a warehouse, etc. and has a shape of a rectangular parallelepiped at completion of assembly.

Figure 7:
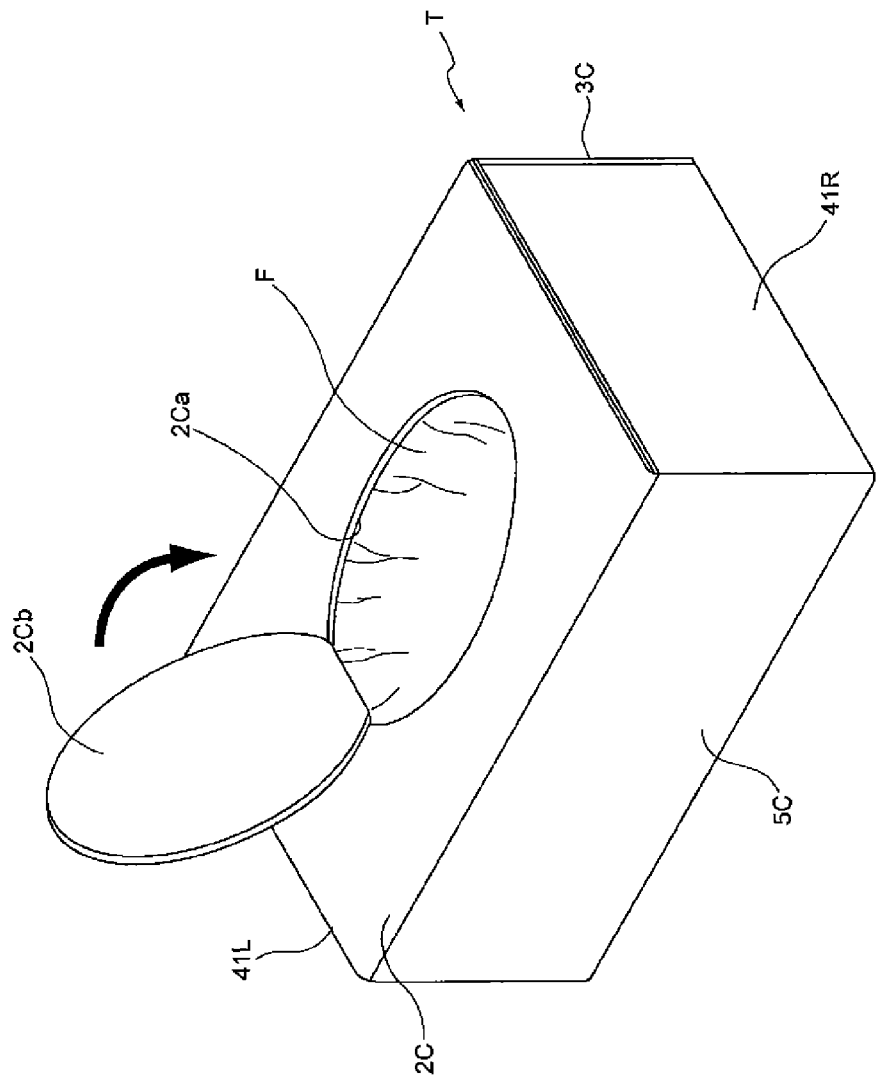
FIG. 7 is a perspective view showing the collapsible toilet (first embodiment) of the present invention at the completion of the assembly.

Note that, for convenience of description, the six faces of the present toilet T are hereinafter referred to as follows: the elongate face on the left front side in FIG. 7 is referred to as a front face (first side face), the remaining side faces are respectively referred to, in the counterclockwise order, as a right side face (second side face), a back face (third side face), and a left side face (fourth side face), and the top and bottom faces are respectively referred to as a top face and a bottom face.

Note also that the direction in parallel with first to fifth row sections 1 to 5 is referred to as a row direction, and the direction orthogonal to the first to fifth row sections 1 to 5 is referred to as a column direction.

The toilet T before assembly is divided (demarcated) into a total of 15 rectangular portions (rectangular shapes) of five rows×3 columns where the major sides are in the lateral width direction and the minor sides are in the vertical width direction.

Note that, for convenience of description, the rows are hereinafter referred to, in the descending order in FIG. 1, as a first row section 1, a second row section 2, a third row section 3, a fourth row section 4, and a fifth row section 5 (in the present toilet T, the first row section 1 and the second row section 2, the second row section 2 and the third row section 3, the third row section 3 and the fourth row section 4, and the fourth row section 4 and the fifth row section 5 are adjacent to each other).

(1) First Row Section 1

The first row section 1 is a section forming the front face (first side face) among the side faces.

The first row section 1 is formed of a first segment 1C in the center (hereinafter referred to as a "center first segment"), a right first segment 1R formed on the right of the center first segment 1C, and a left first segment 1L formed on the left thereof (hereinafter segments will be referred to in a similar manner). The center first segment 1C, the right first segment 1R, and the left first segment 1L have the same vertical width, and the right first segment 1R and the left first segment 1L are formed to be bilaterally symmetric with respect to the intermediate line of the center first segment 1C in the column direction as the symmetric line.

Figure 2:
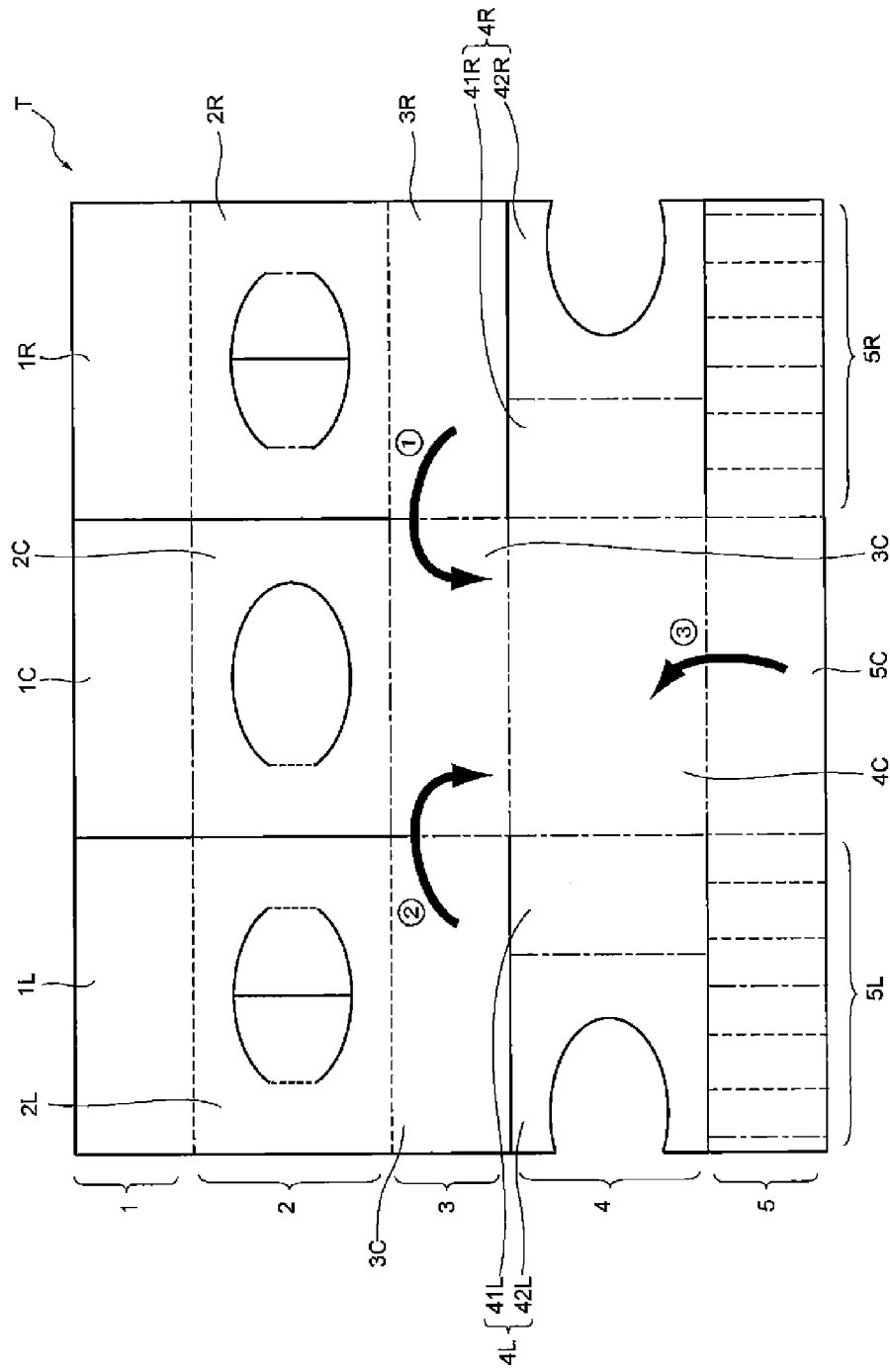
FIG. 2 is an explanatory view (plan view) showing a first stage of an assembly method for the collapsible toilet (first embodiment) of the present invention.

The center first segment 1C and a center second segment 2C are demarcated from each other foldably by a valley-fold division line (fold line), the right first segment 1R and a right second segment 2R by a mountain-fold division line, and the left first segment 1L and a left second segment 2L by a mountain-fold division line (note that, in FIGS. 1 and 2, the broken lines denote mountain-fold division lines, one-dot dashed lines denote valley-fold division lines, and the solid lines denote cut lines).

The center first segment 1C and the right first segment 1R, and the center first segment 1C and the left first segment 1L, are cut off from each other prior to assembly; these three segments are formed to lie on top of one another to serve as the front face.

While it is preferable to cut off the cut positions prior to assembly from the standpoint of assembly, the cut positions may be cut off by the user, etc. at the time of assembly (in this case, perforations, etc. may be formed prior to assembly) (this also applies to cut positions to follow).

(2) Second Row Section 2

The second row section 2 is a section forming the top face.

The second row section 2 is formed of the center second segment 2C, the right second segment 2R formed on the right of the center second segment 2C, and the left second segment 2L formed on the left thereof. The center second segment 2C, the right second segment 2R, and the left second segment 2L have the same vertical width, and the right second segment 2R and the left second segment 2L are formed to be bilaterally symmetric with respect to the intermediate line of the center second segment 2C in the column direction as the symmetric line.

The center second segment 2C and a center third segment 3C are demarcated from each other foldably by a valley-fold division line (fold line), the right second segment 2R and a right third segment 3R by a mountain-fold division line, and the left second segment 2L and a left third segment 3L by a mountain-fold division line. Also, the center second segment 2C and the right second segment 2R, and the center second segment 2C and the left second segment 2L, are previously cut off from each other; these segments are formed to lie on top of one another triply to serve as the top face.

Openings 2Ca, 2Ra, and 2La having an approximately elliptical shape are formed in the center second segment 2C, the right second segment 2R, and the left second segment 2L so that these openings have exactly the same shape and are located at exactly the same position when these segments are laid on top of one another and that these openings are openable and closable.

In other words, the approximately elliptical shape is cut out from the center second segment 2C along its periphery except for a left end portion, to form a lid 2Cb in an approximately elliptical shape, and the opening 2Ca is made openable and closable by moving the lid 2Cb upward and downward.

Also, the approximately elliptical shape is cut out from the right second segment 2R along its periphery except for its right and left end portions and also along the intermediate line bisecting the elliptical shape, to provide bag catch pieces 2Rb and 2Rc in an approximately semielliptical shape that face each other, and the opening 2Ra is made openable and closable by moving the bag catch pieces 2Rb and 2Rc upward and downward like a set of double doors.

Likewise, the approximately elliptical shape is cut out from the left second segment 2L along its periphery except for its right and left end portions and also along the intermediate line bisecting the elliptical shape, to provide movement blocking pieces 2Lb and 2Lc in an approximately semielliptical shape that face each other, and the opening 2La is made openable and closable by moving the movement blocking pieces 2Lb and 2Lc upward and downward like a set of double doors.

Note that, since the right second segment 2R and the left second segment 2L are formed to be bilaterally symmetric, both can play similar roles. Therefore, it is possible to have the bag catch pieces 2Rb and 2Rc of the right second segment 2R bear the function of the movement blocking pieces and the movement blocking pieces 2Lb and 2Lc of the left second segment 2L bear the function of the bag catch pieces.

Otherwise, the openings 2Ca, 2Ra, and 2La of the center second segment 2C, the right second segment 2R, and the left second segment 2L may be simply open. In this case, to block odors, a lid for closing the opening 2Ca of the top face can be provided separately.

(3) Third Row Section 3

The third row section 3 is a section forming the back face.

The third row section 3 is formed of the center third segment 3C, the right third segment 3R formed on the right of the center third segment 3C, and the left third segment 3L formed on the left thereof. The center third segment 3C, the right third segment 3R, and the left third segment 3L have the same vertical width, and the right third segment 3R and the left third segment 3L are formed to be bilaterally symmetric with respect to the intermediate line of the center third segment 3C in the column direction as the symmetric line.

The center third segment 3C and the right third segment 3R are demarcated from each other foldably by a valley-fold division line, the center third segment 3C and the left third segment 3L by a valley-fold division line, and the center third segment 3C and a center fourth segment 4C by a valley-fold division line.

The right third segment 3R and a right fourth segment 4R, and the left third segment 3L and a left fourth segment 4L, are cut off from each other prior to assembly.

(4) Fourth Row Section 4

The fourth row section 4 is a section forming the bottom face, the right side face, the left side face, and the top face.

The fourth row section 4 is formed of the center fourth segment 4C forming the bottom face, the right fourth segment 4R formed on the right of the center fourth segment 4C, and the left fourth segment 4L formed on the left thereof. The right fourth segment 4R and the left fourth segment 4L are further formed of a right side face component 41R and a right top face component 42R, and a left side face component 41L and a left top face component 42L, respectively, starting from the center fourth segment 4C side. The center fourth segment 4C, the right fourth segment 4R, and the left fourth segment 4L have the same vertical width, and the right fourth segment 4R (the right side face component 41R and the right top face component 42R) and the left fourth segment 4L (the left side face component 41L and the left top face component 42L) are formed to be bilaterally symmetric with respect to the intermediate line of the center fourth segment 4C in the column direction as the symmetric line.

The center fourth segment 4C and the right fourth segment 4R are demarcated from each other foldably by a valley-fold division line, the center fourth segment 4C and the left fourth segment 4L by a valley-fold division line, the center fourth segment 4C and a center fifth segment 5C by a valley-fold division line, the right side face component 41R and the right top face component 42R by a valley-fold division line, and the left side face component 41L and the left top face component 42L of the fourth row section 4 by a valley-fold division line.

The right fourth segment 4R and a right fifth segment 5R, and the left fourth segment 4L and a left fifth segment 5L, are cut off from each other prior to assembly Openings 42Ra and 42La are formed in the right top face component 42R and the left top face component 42L from the edge of the right free end and the edge of the left free end, respectively, both in an approximately semielliptical shape having the edge as one end. The right top face component 42R and the left top face component 42L are formed so that, when the top face is formed, the openings 42Ra and 42La unitedly have the same approximately elliptical shape as the openings 2Ca, 2Ra, and 2La formed in the center second segment 2C, the right second segment 2R, and the left second segment 2L and are located at the same position as these openings 2Ca, 2Ra, and 2La so as to be in communication therewith.

(5) Fifth Row Section 5

The fifth row section 5 is a section forming a first reinforcing portion, a second reinforcing portion, and the front face.

The fifth row section 5 is formed of the center fifth segment 5C constituting the front face, the right fifth segment 5R that is formed on the right of the center fifth segment 5C and corresponds to the first reinforcing portion, and the left fifth segment 5L that is formed on the left thereof and corresponds to the second reinforcing portion. The center fifth segment 5C, the right fifth segment 5R, and the left fifth segment 5L have the same vertical width, and the right fifth segment 5R and the left fifth segment 5L are formed or configured to be bilaterally symmetric with respect to the intermediate line of the center fifth segment 5C in the column direction as the symmetric line.

The right fifth segment 5R and the left fifth segment 5L are respectively formed of tuck ends 57R and 57L formed at their free edges and six connecting portions 56R, 55R, 54R, 53R, 52R, and 51R and 56L, 55L, 54L, 53L, 52L, and 51L provided between the tuck ends 57R and 57L and the center fifth segment 5C. The connecting portions 56R, 55R, 54R, 53R, 52R, and 51R, and 56L, 55L, 54L, 53L, 52L, and 51L, are demarcated by six division lines in the column direction orthogonal to the row direction, and during assembly, the connecting portions are divided and folded along the division lines that are a valley-fold line at the boundary with the tuck end 57R or 57L and successively a mountain-fold line, a mountain-fold line, a valley-fold line, a mountain-fold line, and a mountain-fold line, whereby a wave shape having slight crests as viewed from the top is to be formed (see FIG. 4).

The right fifth segment 5R and the left fifth segment 5L are configured so that the tuck ends 57R and 57L are in contact with side face end portions of the back face and that the segments are placed between the top face and the bottom face over the entire areas of the right side face and the left side face (in the vertical width direction of the adjacent fourth segments 4).

Note that an adhesive, a double-sided tape, etc. may be applied or put to the tuck ends 57R and 57L to ensure rigid adhesion.

As described above, the segments constituting each row are formed to be equal in vertical length, the segments constituting each column are formed to be equal in lateral length, and the segments are formed to be bilaterally symmetric, using the line perpendicular to the row direction as the symmetric axis, with respect to the intermediate lines of the center first to fifth segments 1C to 5C in the column direction as the symmetric line.

Also, the segments are formed so that portions corresponding to the same face have the same size.

2. Assembly Method

An assembly method for the present toilet T will be described.

(1) Superposition of First to Third Row Sections 1 to 3 (FIG. 2)

First, the right first to third segments 1R to 3R are folded along the division lines in the column direction to lay these segments on the center first to third segments 1C to 3C, and then the left first to third segments 1L to 3L are folded along the division lines in the column direction to lay these segments on the right first to third segments 1R to 3R (hereinafter this layered portion is sometimes referred to as the "overlap portion").

Note that, since the right first segment 1R and the left first segment 1L (similarly, the right second segment 2R and the left second segment 2L, and the right third segment 3R and the left third segment 31L) are formed to be bilaterally symmetric, it does not matter which one of the two segments is laid on the other.

Figure 3:
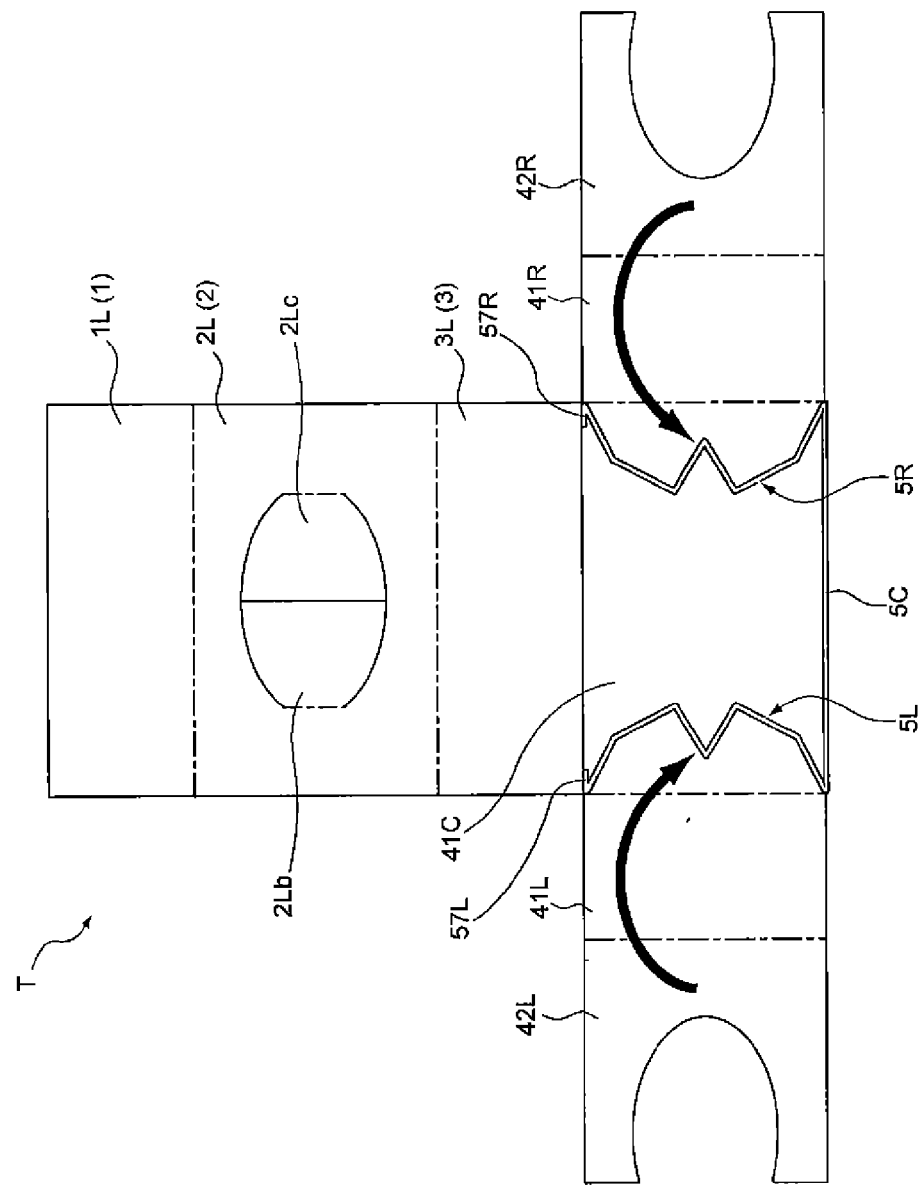
FIG. 3 is an explanatory view (plan view) showing a second stage of the assembly method for the collapsible toilet (first embodiment) of the present invention.
Figure 4:
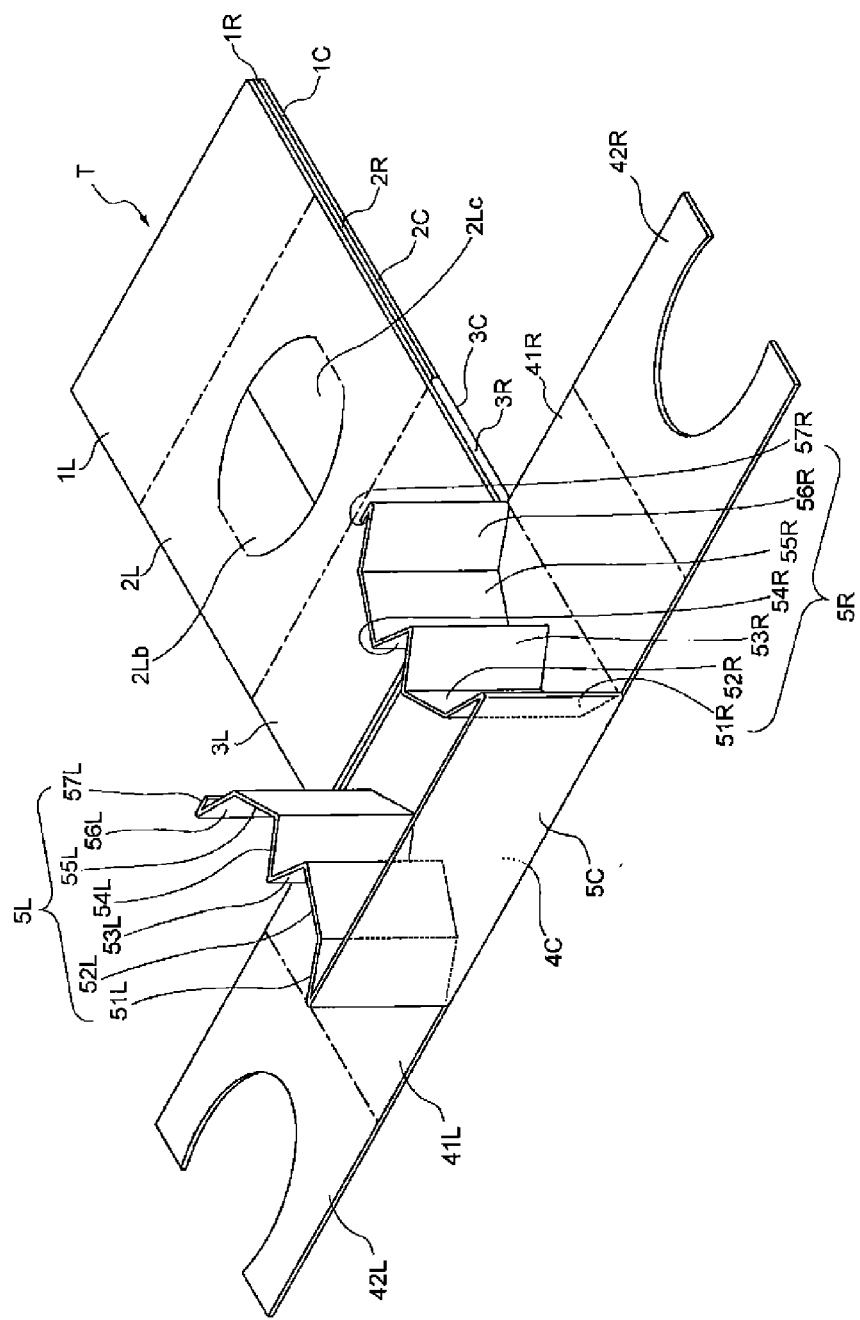
FIG. 4 is an explanatory view (perspective view) showing a third stage of the assembly method for the collapsible toilet (first embodiment) of the present invention.

(2) Assembly of Fourth and Fifth Row Sections 4 and 5 (FIGS. 2 to 4)

Next, the right fifth segment 5R and the left fifth segment 5L of the fifth row section 5 are folded along the division lines, to form the connecting portions 51R, 52R, 53R, 54R, 55R, 56R, 51L, 52L, 53L, 54L, 55L, and 56L and the tuck ends 57R and 57L into a wave shape. The fifth row section 5 is then raised 90 degrees along the division line in the row direction, and also the right fifth segment 5R and the left fifth segment 5L are placed to stand above the center fourth segment 4C.

Thereafter, the right side face component 41R and the right top face component 42R and the left side face component 41L and the left top face component 42L of the fourth row section 4 are raised 90 degrees along the division lines, and then the right top face component 42R and the left top face component 42L are folded 90 degrees, to form the right side face, the left side face, and the top face.

Figure 5:
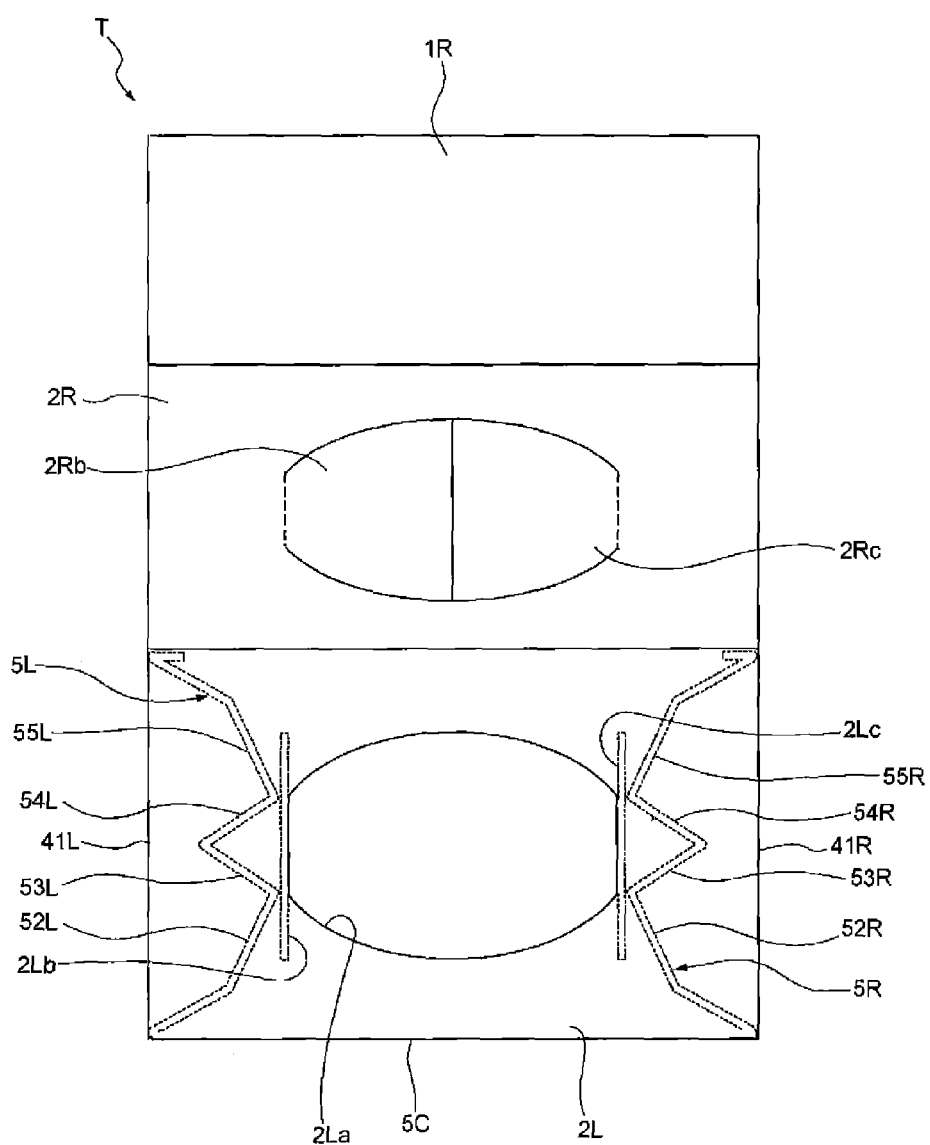
FIG. 5 is an explanatory view (plan view) showing a fourth stage of the assembly method for the collapsible toilet (first embodiment) of the present invention.

(3) Fixation of Right Fifth Segment 5R and Left Fifth Segment 5L (FIG. 5)

Next, the overlap portion is raised 90 degrees to form the back face. The left first segment 1L and the left second segment 2L are then folded 90 degrees, to place the left second segment 2L on the top of the right top face component 42R and the left top face component 42L and place the left first segment 1L on the inner side of the center fifth segment 5C, thereby forming the front face and the top face.

Thereafter, the left and right movement blocking pieces 2Lb and 2Lc of the left second segment 2L are folded downward vertically and fixed by bringing the pieces into contact with portions corresponding to the division line between the connecting portions 52R and 53R and the division line between the connecting portions 54R and 55R of the right fifth segment 5R, and portions corresponding to the division line between the connecting portions 52L and 53L and the division line between the connecting portions 54L and 55L of the left fifth segment 5L.

Figure 6:
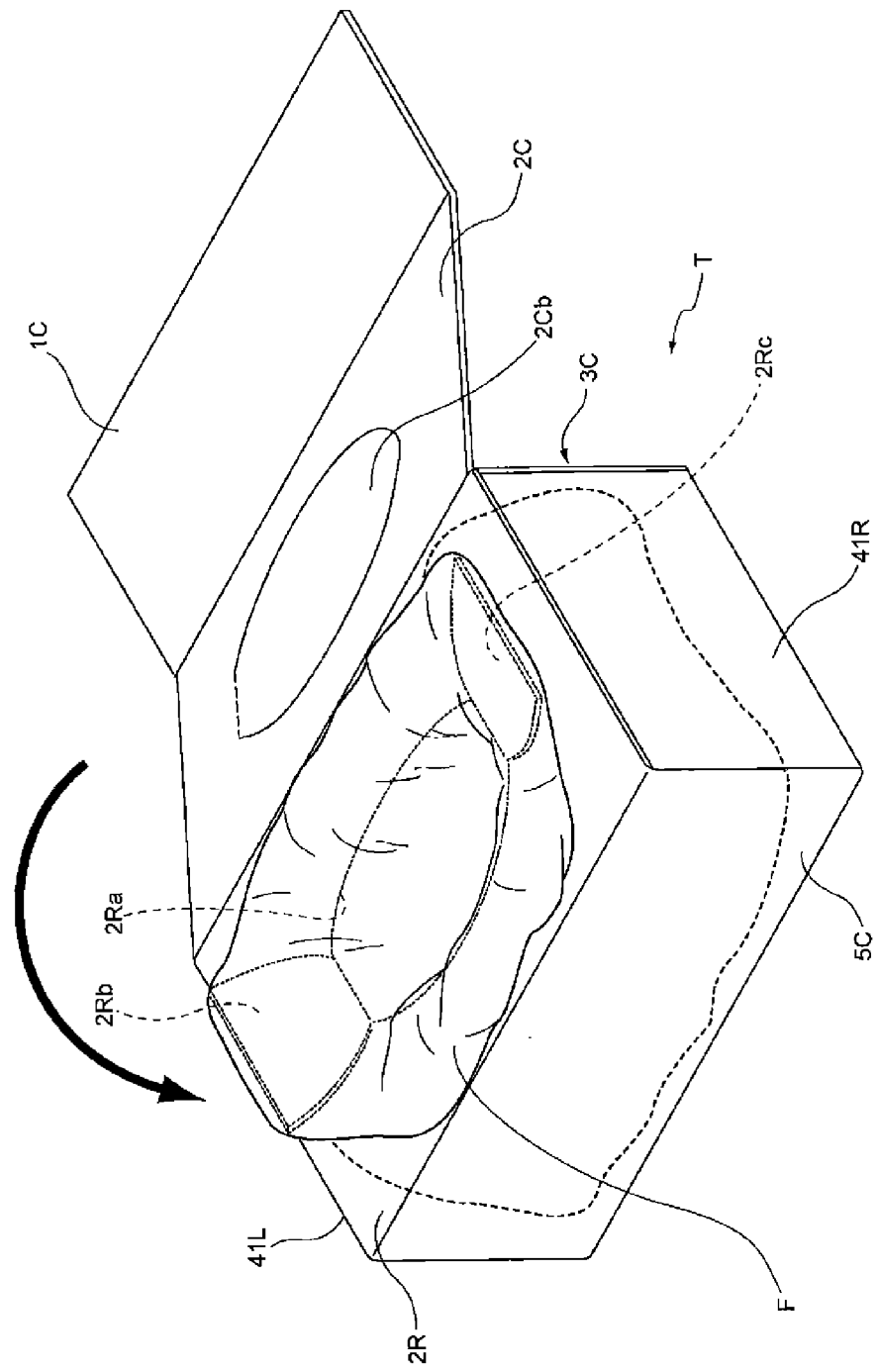
FIG. 6 is an explanatory view (perspective view) showing a fifth stage of the assembly method for the collapsible toilet (first embodiment) of the present invention.

(4) Loading of Excrement Receiving Bag F (FIG. 6)

Next, the right second segment 2R is placed on the top of the left second segment 2L, and the right first segment 1R is placed on the inner side of the center fifth segment 5C and on the outer side of the left first segment 1L, to form the front face and the top face.

An impermeable excrement receiving bag F made of polyethylene, etc. is then loaded by folding the bag catch pieces 2Rb and 2Rc of the right second segment 2R upward, allowing the pieces 2Rb and 2Rc to catch part of the open edge of the excrement receiving bag F, and then folding the bag catch pieces 2Rb and 2Rc 180 degrees so that the top surfaces thereof come into contact with the top surface of the right second segment 2R.

The inside of the excrement receiving bag F is filled with known urine treatment materials (a water absorbing material, an aromatic substance, etc.) (not shown) in the form of granules, powder, etc.

(5) Completion of Assembly (FIG. 7)

Finally, the center second segment 2C is placed on the top of the right second segment 2R, to press the bag catch pieces 2Rb and 2Rc from above, and the center first segment 1C is placed on the inner side of the center fifth segment 5C and on the outer side of the right first segment 1R, to form the front face and the top face, thereby completing the assembly of the toilet T.

3. Manufacturing Method

The present toilet T can be manufactured by a known method.

That is, the toilet T can be manufactured by subjecting a cardboard sheet to pressing to form mountain-fold division lines and valley-fold division lines at the predetermined positions of the sheet and also cutting the sheet at predetermined positions.

4. Usage

The usage of the present toilet T will be described.

First, the toilet T is assembled according to the assembly method described above.

Thereafter, the lid 2Cb of the top face constituting a lid portion is opened to expose the opening 2Ca. The user then straddles the top face and excretes wastes into the inside through the opening 2Ca. After the excrement, by closing the lid portion 2Ca, the toilet can be kept without the fear of odors being released outside.

When the excrement exceeds a predetermined amount, it is possible to open one layer of the top face and take the excrement receiving bag F out of the toilet to dispose of only the excrement receiving bag F.

In this case, when the toilet T is to be used again, it can be made ready for use by placing a new excrement receiving bag F in the toilet T.

When the toilet T is not used, it can be returned to the shape of the board in reverse order to the assembly method described above.

5. Effects

According to the present toilet T, the right fifth segment 5R as the first reinforcing portion and the left fifth segment 5L as the second reinforcing section are formed in the fifth row section 5, and the first and second reinforcing portions are formed to have a wave shape after assembly. Therefore, a predetermined strength can be maintained even though a thin-plate material is used. Also, the first and second reinforcing portions are placed along the adjacent right side face and left side face over the entire area in the vertical width direction. Therefore, the portions of the top face on the right side face side and the left side face side on which a load is to be mounted are supported from below, and thus can be effectively reinforced.

Also, according to the present toilet T, since it is formed of a rectangular board having no part to be removed, waste of the raw material can be effectively prevented, and thus the toilet can be manufactured at low cost.

Moreover, according to the present toilet T, the approximately elliptical openings 2Ca, 2Ra, and 2La are formed in the center second segment 2C, the right second segment 2R, and the left second segment 2L so that these openings have exactly the same shape and are located at exactly the same position when laid on top of one another and that these openings are openable and closable, and the openings 2Ca, 2Ra, and 2La are in communication with each other. Therefore, the opening 2Ca through which the user excretes wastes can be easily provided.

Furthermore, according to the present toilet T, by folding the movement blocking pieces 2Lb and 2Lc toward the bottom face through the opening 2La, the first reinforcing portion and the second reinforcing portion can be easily positioned. Thus, the strength can be secured with the simple means.

Further, according to the present toilet T, provided with the bag catch pieces 2Rb and 2Rc, it is possible to easily catch the opening edge of the excrement receiving bag F by folding back the bag catch pieces 2Rb and 2Rc and thus load the bag in a simple way.

Moreover, since only the excrement receiving bag F can be easily replaced, disposal of excrement can be made in a simple way. The toilet can therefore be used repeatedly.

Furthermore, with the inside of the excrement receiving bag F filled with various types of urine treatment materials, urine can be absorbed and release of odor can be prevented. Therefore, the toilet is also advantageous from the sanitary standpoint.

In addition, according to the present toilet T, the top face is formed of the three segments 2C, 2R, and 2L of the second row section 2, and the bag catch pieces 2Rb and 2Rc are provided in the second-layer segment from the top, to hide the catch portions of the excrement receiving bag F. Therefore, an aesthetically pleasing toilet can be provided.

Second Embodiment

1. Configuration of Toilet T' Before Assembly

Figure 8:
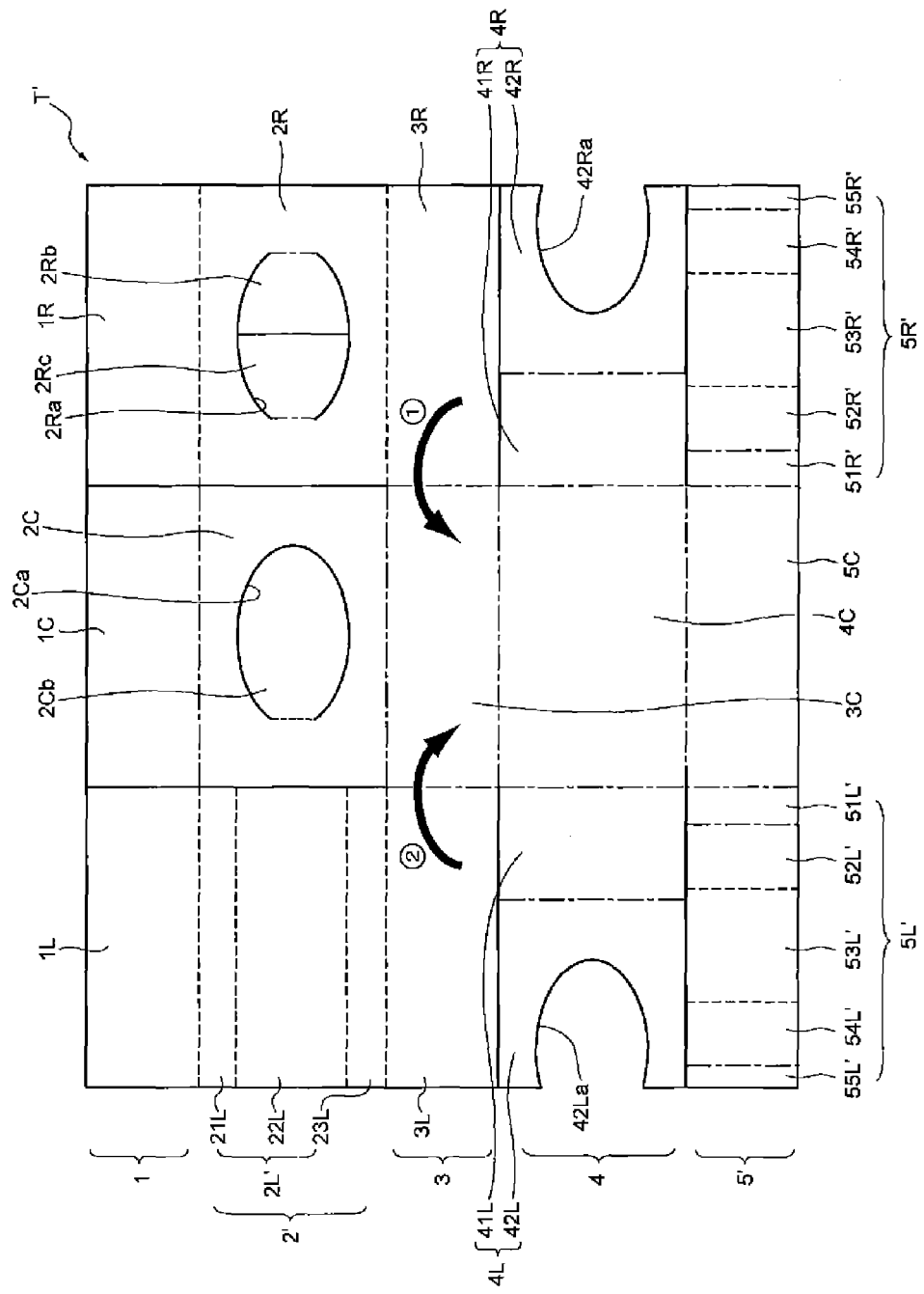
FIG. 8 is a development view of a collapsible toilet (second embodiment) of the present invention.

A present toilet T' (second embodiment) before assembly is different from the toilet T' of the first embodiment only in a left second segment 2L' of a second row section 2' and first and second reinforcing portions of a fifth row section 5' (FIG. 8). The second embodiment will be described hereinafter mainly centering on the different portions.

(1) First Row Section 1

The first row section 1 is formed of the center first segment 1C, the right first segment 1R formed on the right of the center first segment 1C, and the left first segment 1L formed on the left thereof.

Note however that, since the left first segment 1L is to be part of a third reinforcing portion as will be described later, only the center first segment 1C and the right first segment 1R are folded along the division line (fold formation line) to lie on top of each other, thereby forming the front face.

(2) Second Row Section 2'

The second row section 2' is formed of the center second segment 2C, the right second segment 2R formed on the right of the center second segment 2C, and a left second segment 2L' formed on the left thereof. The center second segment 2C, the right second segment 2R, and the left second segment 2L' have the same vertical width, and the basic structures of the right second segment 2R and the left second segment 2L' (except for the manner in which the division lines are drawn) are formed to be bilaterally symmetric with respect to the intermediate line of the center second segment 2C in the column direction as the symmetric line.

The left second segment 2L' is formed of a first wall portion 21L, a second wall portion 22L, and a third wall portion 23L in the order from the left first segment 1L side to the left third segment 3L side. The left first segment 1L and the first wall portion 21L, any two adjacent wall portions, and the third wall portion 23L and the left third segment 3L are demarcated from each other by corresponding mountain-fold division lines extending in the row direction. This portion is formed to serve as the third reinforcing portion.

No opening is formed in the left second segment 2L'.

The center second segment 2C and the right second segment 2R are formed to be folded along their division line to lie on top of each other, thereby serving as the top face.

Note that, since the basic structures of the right second segment 2R and the left second segment 2L' are formed to be bilaterally symmetric, both can play similar roles. Therefore, the configuration of the left second segment 2L' and the configuration of the right second segment 2R can be interchanged.

(3) Third Row Section 3

The third row section 3 is formed of the center third segment 3C, the right third segment 3R formed on the right of the center third segment 3C, and the left third segment 3L formed on the left thereof.

Note however that, since the left third segment 3L is to serve as part of the third reinforcing portion, the center third segment 3C and the right third segment 3R are folded along their division line to lie on top of each other, thereby forming the front face.

As described above, by folding the left first segment 1L, the left second segment 2L' (the first wall portion 21L, the second wall portion 22L, and the third wall portion 23L), and the left third segment 3L along the four division lines extending in the row direction, a tubular body can be formed. This tubular body is formed to serve as the third reinforcing portion placed at a position that is between the top face and the bottom face and in contact with the back face.

Note that the dimensions of the portions must be properly determined so that the third reinforcing portion is formed into a tubular body in the shape of a rectangular parallelepiped (although having no side faces).

(4) Fifth Row Section 5'

A fifth row section 5' is a section forming the first reinforcing portion, the second reinforcing portion, and the front face.

The fifth row section 5' is formed of the center fifth segment 5C constituting the front face, a right fifth segment 5R' that is formed on the right of the center fifth segment 5C and corresponds to the first reinforcing portion, and a left fifth segment 5L' that is formed on the left thereof and corresponds to the second reinforcing portion. The center fifth segment 5C, the right fifth segment 5R', and the left fifth segment 5LL have the same vertical width, and the right fifth segment 5R' and the left fifth segment 5L' are formed to be bilaterally symmetric with respect to the intermediate line of the center fifth segment 5C in the column direction as the symmetric line.

The right fifth segment 5R' and the left fifth segment 5L' are respectively formed of tuck ends 55R' and 55L' formed on their free edges and four connecting portions 54R', 53R', 52R', and 51R' and 54L', 53L', 52L', and 51L' provided between the tuck ends 55R' and 55L' and the center fifth segment 5C. The connecting portions 54R', 53R', 52R', and 51R', and 54D, 53L', 52L', and 51E, are respectively demarcated by four division lines in the column direction, and during assembly, the connecting portions are divided and folded along the division lines that are a valley-fold line at the boundary with the tuck end 55R' or 55L' and successively a mountain-fold line, a mountain-fold line, and a valley-fold line, whereby a convex wave shape as viewed from the top is to be formed (see FIG. 8).

The right fifth segment 5R' and the left fifth segment 5L' are configured so that the tuck ends 55R' and 55L' are in contact with the side faces of the third reinforcing portion in the column direction and that the segments are placed between the top face and the bottom face over the area of the center fourth segment 4C in the vertical width direction.

Note that the tuck ends 55R' and 55L' may be inserted into the space formed in the side faces of the third reinforcing portion in the column direction to be joined with the third reinforcing portion.

As an alteration of the present toilet T', in the left second segment 2L', no fold line may be formed along the division line between the left first segment 1L and the first wall portion 21L, and the first wall portion 21L and the second wall portion 22L may be valley-folded along the division line, so that the third reinforcing portion has a U shape with its opening facing downward (a shape like a ladle as a whole with its opening facing downward) as viewed from the side. In this case, since a tubular body is formed from the third reinforcing portion and the bottom face, similar effects to those of the toilet T' of this embodiment can be obtained.

2. Assembly Method

An assembly method for the present toilet T' will be described.

(1) Superposition of First to Third Row Sections 1 to 3 (FIG. 8)

First, the right first to third segments 1R to 3R are folded along the cut line and the division line in the column direction to lay these segments on the center first to third segments 1C to 3C.

Figure 9:
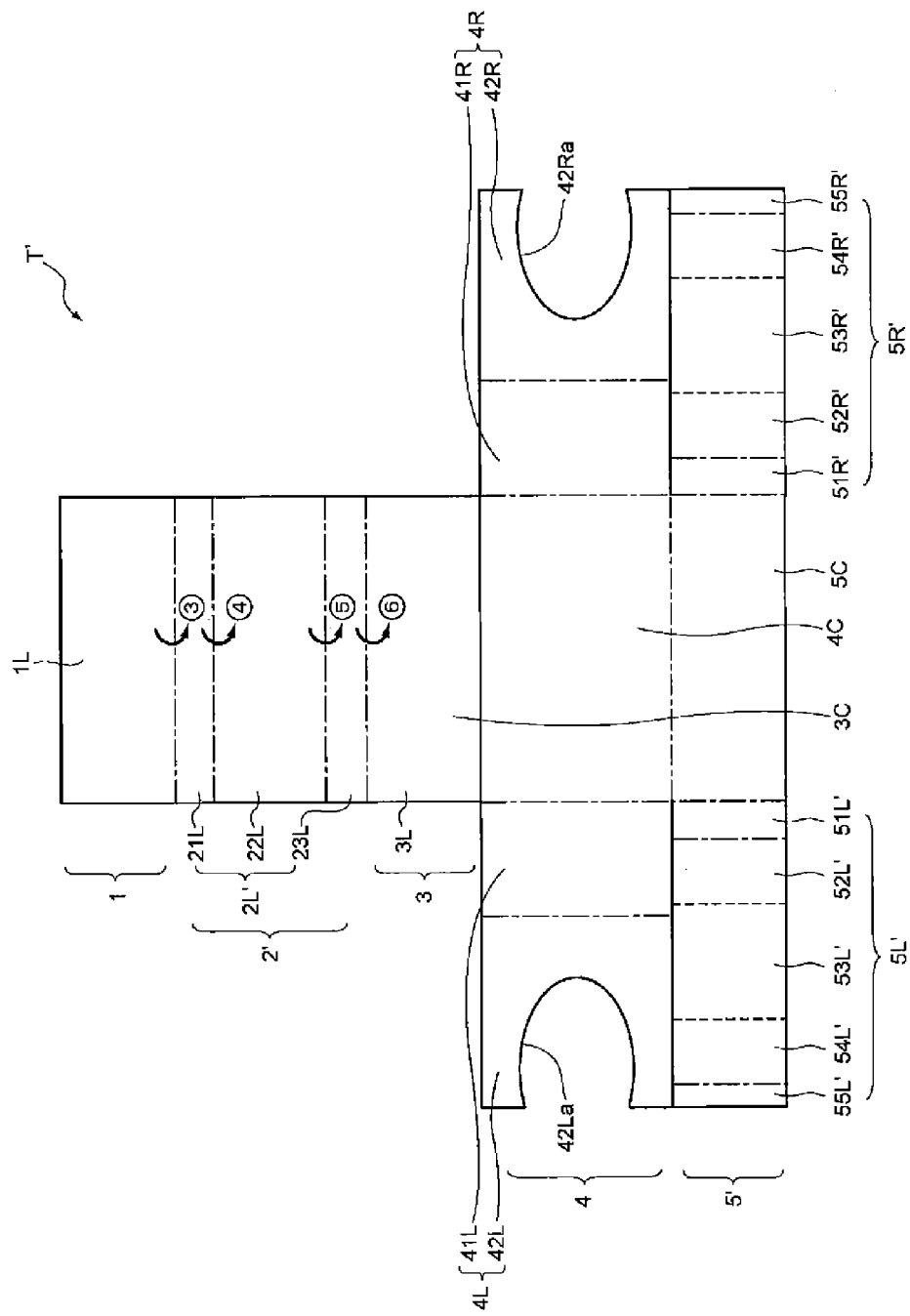
FIG. 9 is an explanatory view (plan view) showing a first stage of an assembly method for the collapsible toilet (second embodiment) of the present invention.
Figure 10:
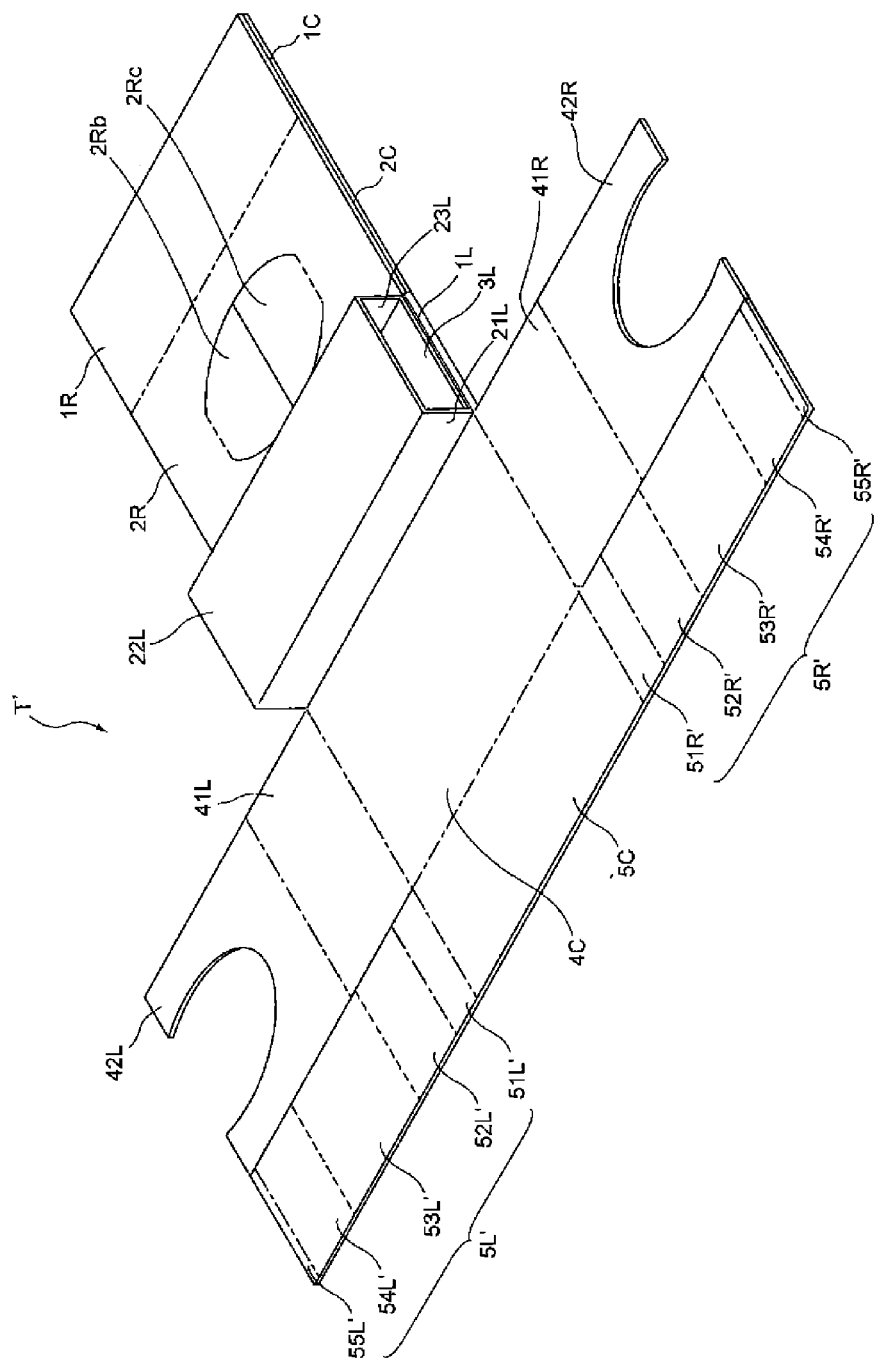
FIG. 10 is an explanatory view (perspective view) showing a second stage of the assembly method for the collapsible toilet (second embodiment) of the present invention.

(2) Assembly of Third Reinforcing Portion (FIGS. 9 and 10)

Then, the left first to third segments 1L to 3L are folded along the cut line and the division line in the column direction, and the tubular third reinforcing portion is assembled.

Figure 11:
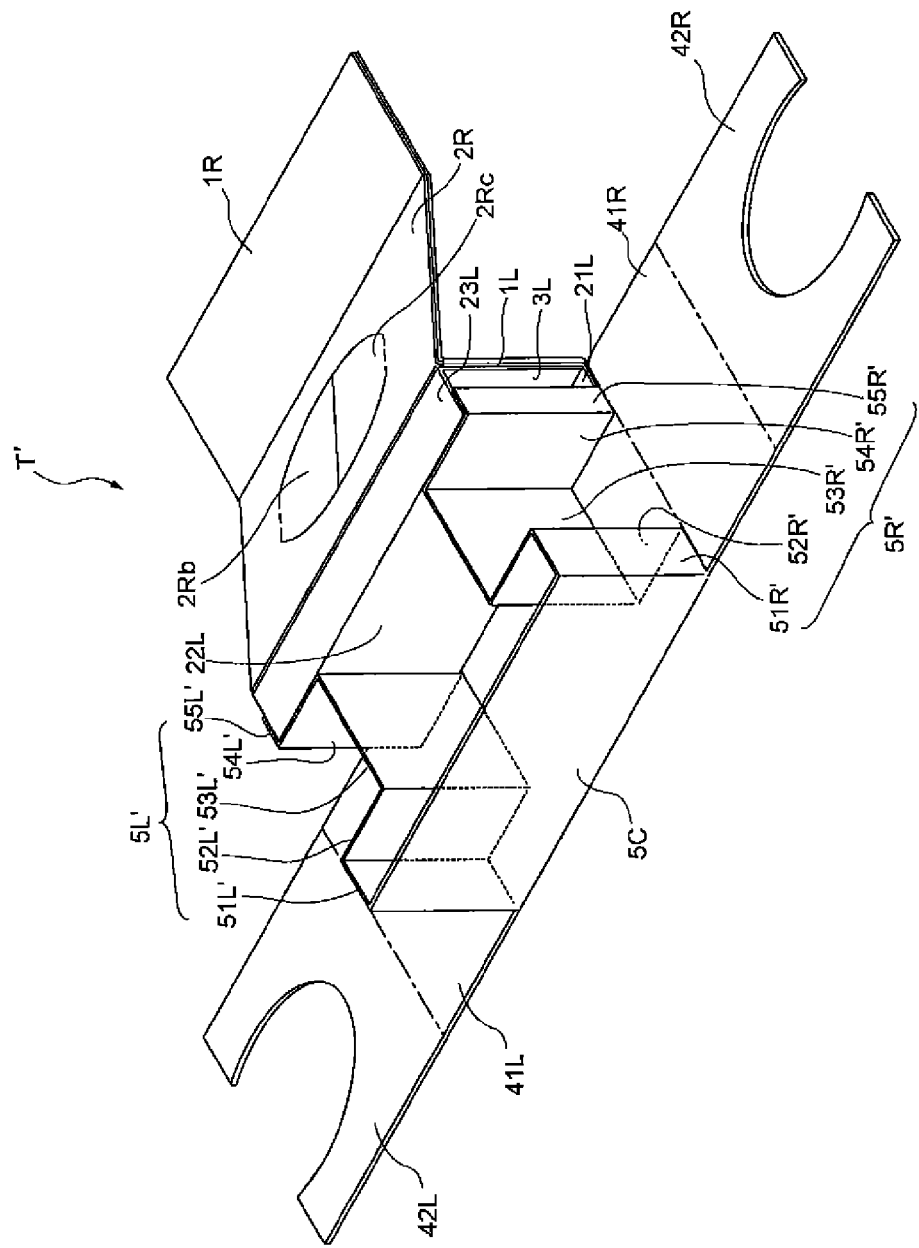
FIG. 11 is an explanatory view (perspective view) showing a third stage of the assembly method for the collapsible toilet (second embodiment) of the present invention.

(3) Assembly of Fourth and Fifth Row Sections 4 and 5 (FIG. 11)

Next, the right fifth segment 5R' and the left fifth segment 5L' of the fifth row section 5' are folded along the division lines in the column direction, to form the connecting portions 51R', 52R', 53R', 54R', 51L', 52L', 53E, and 54E and the tuck ends 55R' and 55L' into a wave shape. The fifth row section 5' is then raised 90 degrees along the division line in the row direction, and also the right fifth segment 5R' and the left fifth segment 5L' are placed to stand above the center fourth segment 4C.

Thereafter, the right side face component-41R and the right top face component 42R and the left side face component 41L and the left top face component 42L of the fourth row section 4 are raised 90 degrees along the division lines, and then the right top face component 42R and the left top face component 42L are folded 90 degrees, to form the right side face, the left side face, and the top face.

(4) Fixation of Third Reinforcing Portion and Right Fifth Segment 5R' (FIG. 11)

Next, the third reinforcing portion is raised 90 degrees to be placed along the side of the center fourth segment 4C in the major side direction (row direction). The overlap portion of the center first to third segments 1C to 3C and the right first to third segments 1R to 3R is then raised 90 degrees and brought into close contact with the wall of the third reinforcing portion on the back face side, to form the back face.

Figure 12:
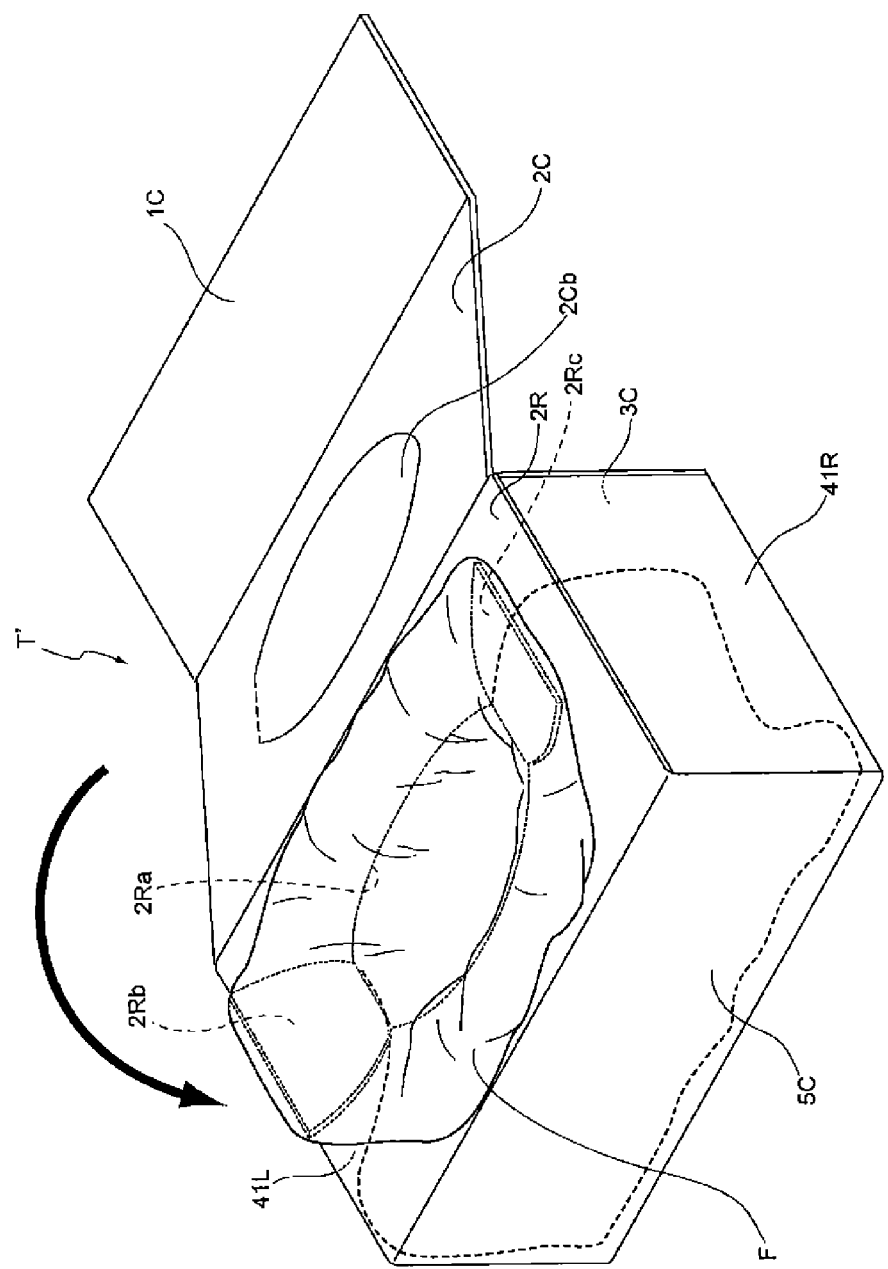
FIG. 12 is an explanatory view (perspective view) showing a fourth stage of the assembly method for the collapsible toilet (second embodiment) of the present invention.

(5) Loading of Excrement Receiving Bag F (FIG. 12)

Thereafter, the right first segment 1R is placed on the inner side of the center fifth segment 5C, to form the front face and the top face. Then, an impermeable excrement receiving bag F made of polyethylene, etc. is loaded by folding the bag catch pieces 2Rb and 2Rc of the right second segment 2R upward, allowing the pieces 2Rb and 2Rc to catch part of the open edge of the excrement receiving bag F, and then folding the bag catch pieces 2Rb and 2Rc 180 degrees so that the top surfaces of the pieces 2Rb and 2Rc come into contact with the top surface of the right second segment 2R.

(6) Completion of Assembly

Finally, the center second segment 2C is placed on the top of the right second segment 2R, to press the bag catch pieces 2Rb and 2Rc from above, and the center first segment 1C is placed on the inner side of the center fifth segment 5C and on the outer side of the right first segment 1R, to form the front face and the top face, thereby completing the assembly of the toilet T.

3. Effects

According to the toilet T' of the second embodiment, substantially the same effects as those of the toilet T of the first embodiment can be obtained. In addition, since the third reinforcing portion is in close contact with the back face and extends along the entire area of the center fourth segment 4C in the lateral width direction, the portions of the top face on the right side face side and the left side face side on which a load is to be mounted can be supported from below, and thus can be effectively reinforced. Also, since the third reinforcing portion formed into a tubular shape having a closed section is high in stiffness, a load acting on the portion of the top face on the back face side from above can be effectively supported.

Third Embodiment

1. Configuration of Toilet T' before Assembly

Figure 13:
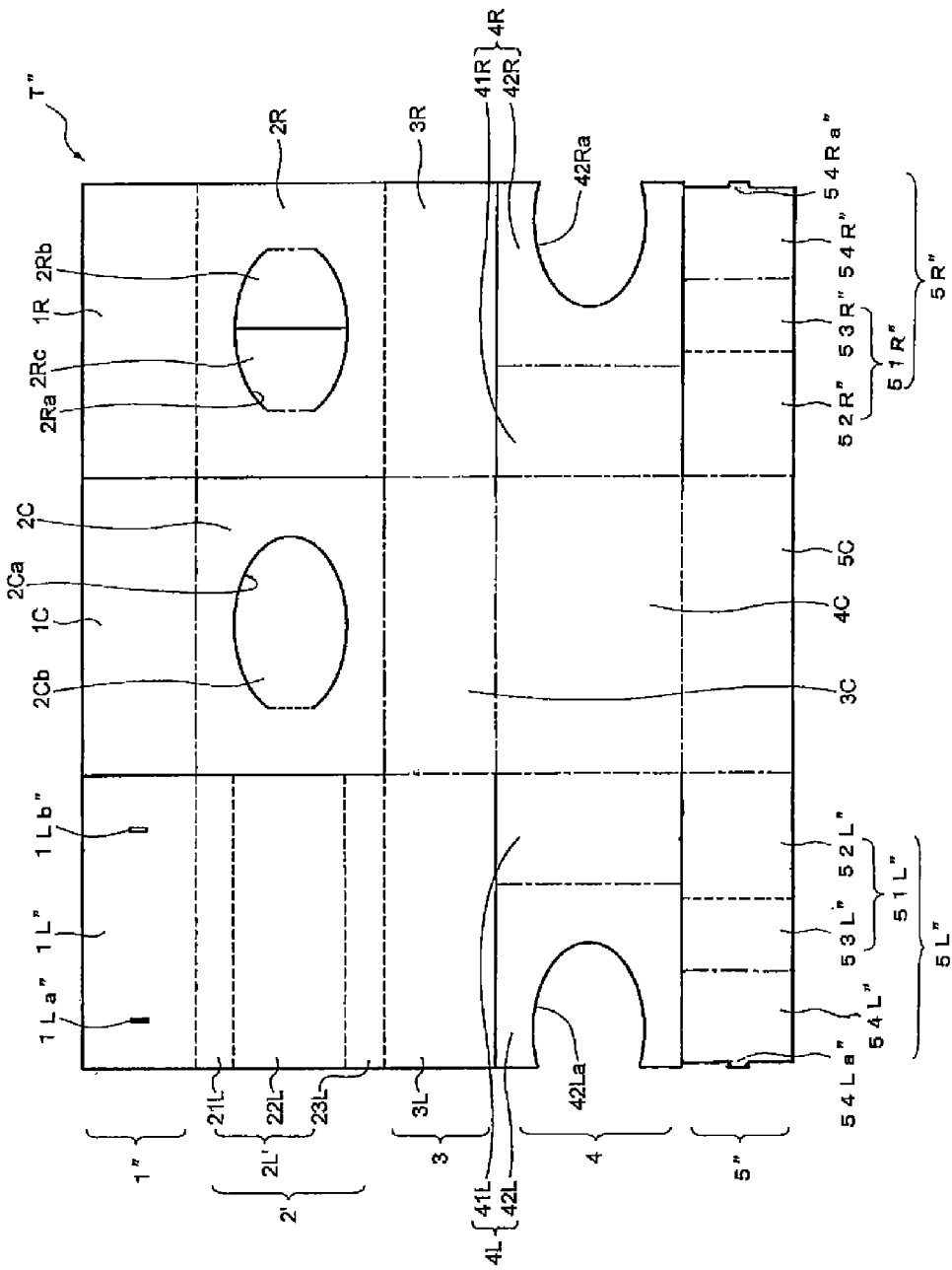
FIG. 13 is a development view of a collapsible toilet (third embodiment) of the present invention.
Figure 14:
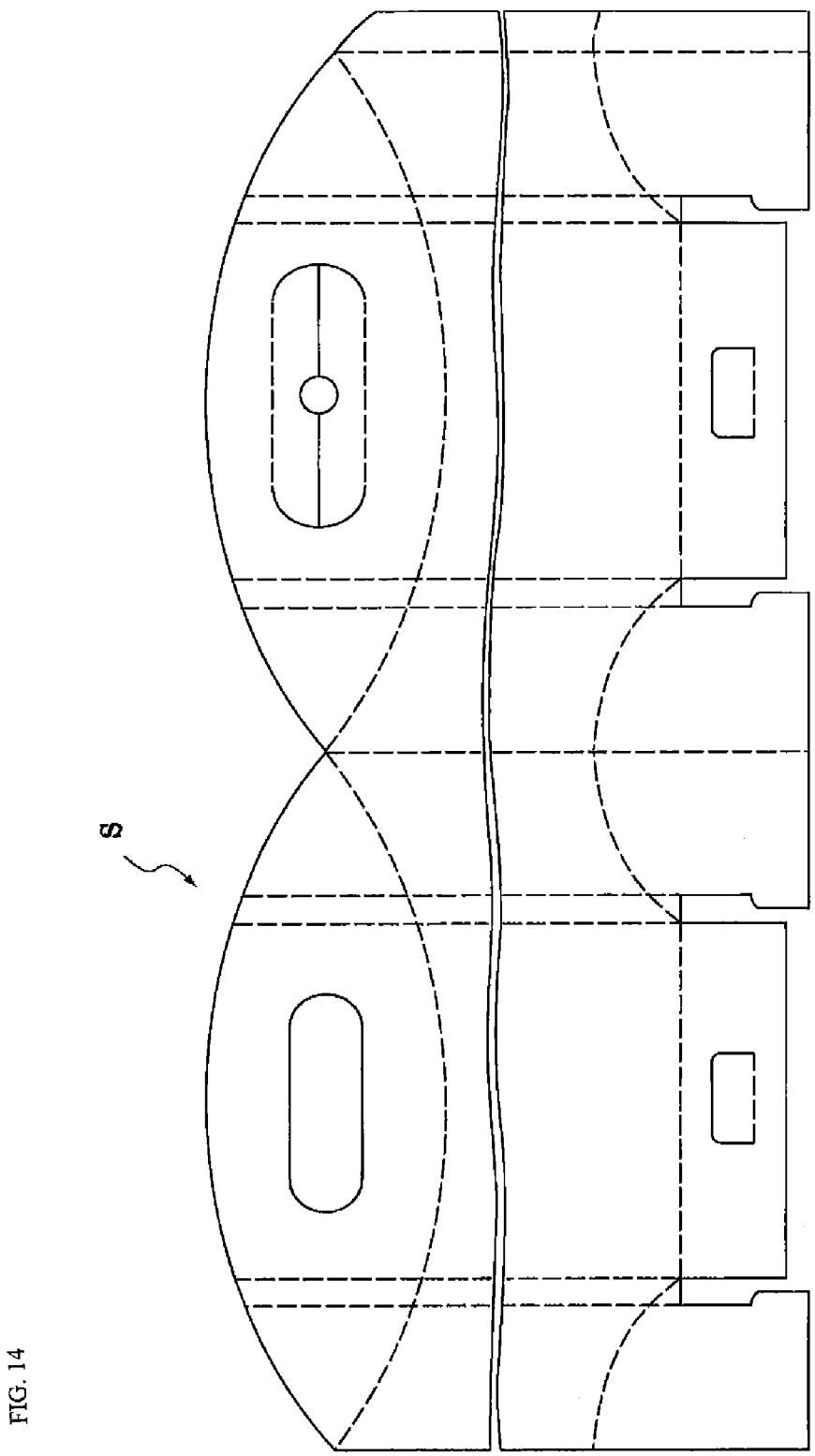
FIG. 14 is a development view of a conventional collapsible toilet.
Figure 15:
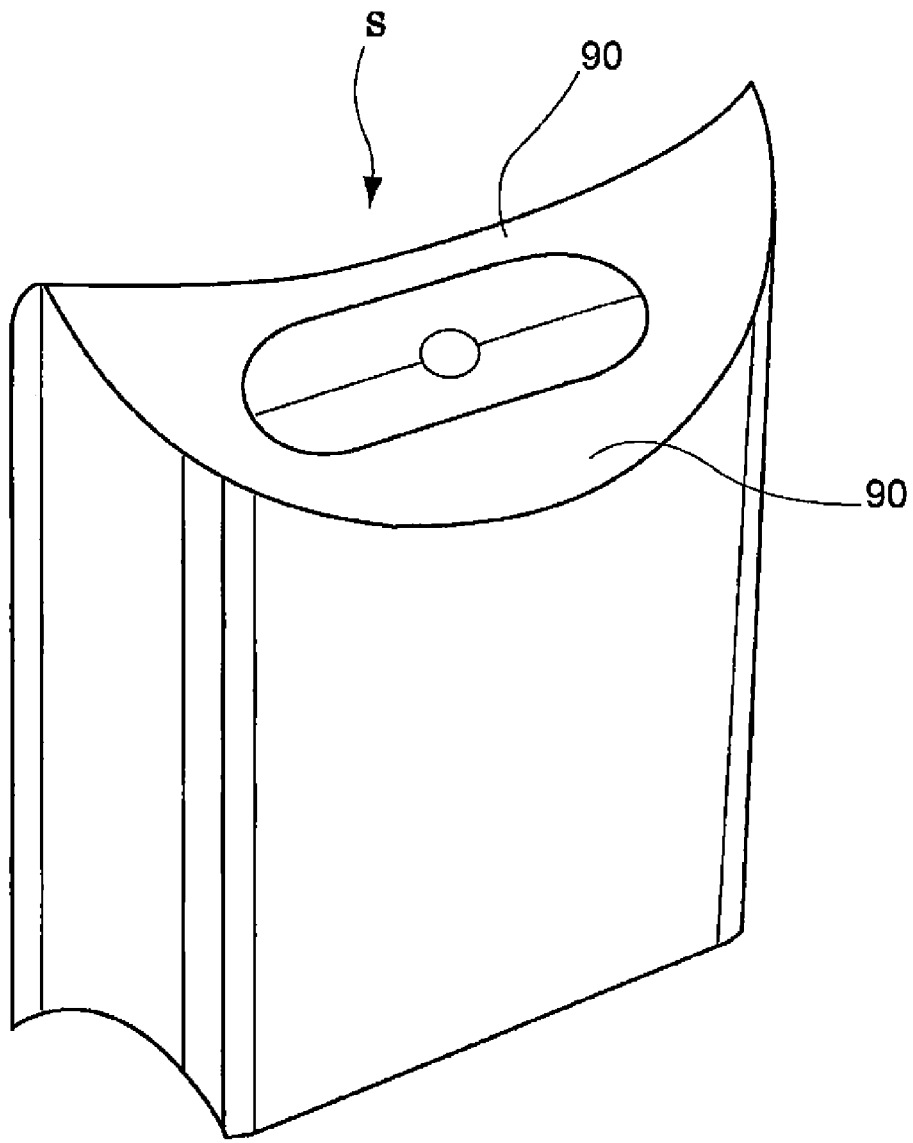
FIG. 15 is a perspective view of the conventional collapsible toilet.

A present toilet T' (third embodiment) before assembly is different from the toilet T' of the second embodiment only in a left first segment 1L" of a first row section 1" and first and second reinforcing portions of a fifth row section 5" (FIG. 13). The third embodiment will be described hereinafter centering on the different portions.

(1) First Row Section 1"

The first row section 1" is formed of the center first segment 1C, the right first segment 1R formed on the right of the center first segment 1C, and a left first segment 1L" formed on the left thereof.

Two through holes 1La" and 1Lb" that are to fit with protrusions 54Ra" and 54La" of the fifth row section to be described later are formed at predetermined positions in the left first segment 1L".

(2) Fifth Row Section 5"

The fifth row section 5" is a section forming the first reinforcing portion, the second reinforcing portion, and the front face.

The fifth row section 5" is formed of the center fifth segment 5C constituting the front face, a right fifth segment 5R" that is formed on the right of the center fifth segment 5C and corresponds to the first reinforcing portion, and a left fifth segment 5L" that is formed on the left thereof and corresponds to the second reinforcing portion. The center fifth segment 5C, the right fifth segment 5R", and the left fifth segment 5L" have the same vertical width, and the right fifth segment 5R" and the left fifth segment 5L" are formed to be bilaterally symmetric with respect to the intermediate line of the center fifth segment 5C in the column direction as the symmetric line.

The right fifth segment 5R' and the left fifth segment 5L' are respectively formed of a right side face parallel portion (second side face parallel portion) 54R" and a left side face parallel portion (fourth side face parallel portion) 54L' having the protrusions 54Ra" and 54La" formed at their free edges; and two connecting portions (53R" and 52R") and (53L" and 52L") connected with the right side face parallel portion 54R" and the left side face parallel portion 54L" and provided between these portions 54R" and 54L" and the center fifth segment 5C. Each of the portions between the right side face parallel portion 54R" or the left side face parallel portion 54L" and the center fifth segment 5C is demarcated by three division lines in the column direction, which are a valley-fold line, a mountain-fold line, and a valley-fold line in the order from the right or left side face parallel portion 54R" or 54L" side.

During assembly, the two connection portions (53R" and 52R") and (53L" and 52L") are folded by the division lines, partly overlapping each other, and placed near the front face to extend roughly in parallel therewith up to approximately the middle of the major side, thereby forming right and left front face near portions (first side face near portions) 51R" and 51L".

The right side face parallel portion 54R" and the left side face parallel portion 54L" are formed to be perpendicular to the right and left front face near portions 51R" and 51L".

With the above arrangement, the right side face parallel portion 54R" and the right front face near portion 51R", and the left side face parallel portion 54L" and the left front face near portion 51L", are placed to form an approximately T shape as viewed from the top, forming the second reinforcing portion and the first reinforcing portion, respectively.

The assembly method for the present toilet T' is substantially the same as that for the toilet T' of the second embodiment. In this embodiment, however, the protrusions 54Ra" and 54La" of the first and second reinforcing portions are inserted into the through holes 1La" and 1Lb" of the left first segment 1L", whereby the reinforcing portions can be positioned and fixed.

The present toilet T' has the right and left front face near portions 51R" and 51L" and the right and left side face parallel portions 54R" and 54L". Since the front face near portions 51R" and 51L" are placed near the front face to be roughly in parallel therewith, the portion of the top face on the front face side on which a load is to be mounted can be supported from below, and thus effectively reinforced.

Also, like the toilet 97 of the second embodiment, with the right side face parallel portion 54R" and the left side face parallel portion 54L", the portions of the top face on the right and left side face sides can be effectively reinforced.

While preferred embodiments of the present invention have been described, the present invention is not limited to these embodiments, but design changes can be appropriately made without departing from the spirit and scope of the invention.

For example, the present toilet has no limitation in its material, etc. as long as it is formed to be foldable, and has no limitation in its size, etc. as long as no problem on strength arises.

Also, no limitation is posed on the shape of the openings, and the shapes of the movement blocking pieces and the bag catch pieces, in the second row section.

The opening of the topmost segment of the second row section may be completely open, and in this case, a mount for supporting a lid for closing the opening may be formed. Having such a mount, the opening can be easily closed without requiring special work.

The front face and the top face must be formed of at least the center first segment, the center second segment, and the center third segment. It is however unnecessary to lay all of the right first segment, the right second segment, and the right third segment, and the left first segment, the left second segment, and the left third segment, on the first segments, but some of them may be laid (note however that, in order to improve the strength, it is better to have a larger number of segments laid on top of one another).

Moreover, when the opening in the top face is formed of a plurality of openings laid on top of one another, such openings may be made smaller as the position is farther from the top. With this configuration, the lid for closing the topmost opening can be placed without requiring special work. This configuration is preferable because, since the opening is inclined toward the bottom, excrement such as urine can be efficiently guided into the inside of the toilet.

In the present toilet, the excrement receiving bag may be loaded on the top face. If the present toilet is disposable after one use, it is not necessarily required to set the excrement receiving bag.

Moreover, it is not necessarily required to fill the bag with urine treatment materials, or, if such materials are used, they may be directly put in the toilet, not via the excrement receiving bag.

REFERENCE SIGNS LIST

T, T', T" Collapsible toilet
1, 1" First row section
1C Center first segment
1R Right first segment
1L, 1L" Left first segment
2, 2' Second row section
2C Center second segment
2R Right second segment
2L, 2L' Left second segment
21L First wall portion
22L Second wall portion
23L Third wall portion
2Ca, 2Ra, 2La, 42Ra, 42La Opening
2Rb, 2Rc Bag catch piece
2Lb, 2Lc Movement blocking piece
3 Third row section
3C Center third segment
3R Right third segment
3L Left third segment
4 Fourth row section
4C Center fourth segment
4R Right fourth segment
4L Left fourth segment
41R Right side face component
42R Right top face component
41L Left side face component
42L Left top face component
5, 5', 5" Fifth row section
5C Center fifth segment
5R, 5R', 5R" Right fifth segment
5L, 5L', 5L" Left fifth segment
51R", 51L" Front face near portion (first side face near portion)
54R" Right side face parallel portion (second side face parallel portion)
54L" Left side face parallel portion (fourth side face parallel portion)

The invention claimed is:

1. A collapsible toilet made from a rectangular board that is demarcated into five rows×three columns of rectangular segments by foldable division lines or perforation lines and shaped into a rectangular parallelepiped when assembled, the toilet comprising:
a first row section that forms a first side face and a third reinforcing portion for a top face;
a second row section that is adjacent to the first row section and forms the top face and the third reinforcing portion for the top face;
a third row section that is adjacent to the second row section and forms a third side face opposite to the first side face;
a fourth row section that is adjacent to the third row section and forms at least a second side face, a fourth side face opposite to the second side face, and a bottom face; and
a fifth row section that is adjacent to the fourth row section and forms a first reinforcing portion for the top face, a second reinforcing portion for the top face, and the first side face,
wherein an opening is formed in the top face,
during the assembly, the first reinforcing portion and the second reinforcing portion are each formed into a wave-shape portion by a plurality of division lines orthogonal to the row direction, and the first reinforcing portion and the second reinforcing portion can be placed along the second side face and the fourth side face, respectively, over portions of at least a half or more of the side length of the second side face and the fourth side face, and
the third reinforcing portion is configured to form a tubular portion or a U-shape portion with its opening facing downward as viewed from the side with one division line or a plurality of division lines in the row direction, and is placed along the third side face.

2. A collapsible toilet made from a rectangular board that is demarcated into five rows×three columns of rectangular segments by foldable division lines or perforation lines and shaped into a rectangular parallelepiped when assembled, the toilet comprising:
a first row section that forms a first side face and a third reinforcing portion for a top face;
a second row section that is adjacent to the first row section and forms the top face and the third reinforcing portion for the top face;
a third row section that is adjacent to the second row section and forms a third side face opposite to the first side face;
a fourth row section that is adjacent to the third row section and forms at least a second side face, a fourth side face opposite to the second side face, and a bottom face; and
a fifth row section that is adjacent to the fourth row section and forms a first reinforcing portion for the top face, a second reinforcing portion for the top face, and the first side face,
wherein an opening is formed in the top face,
during the assembly, the first reinforcing portion includes,
a first side face near portion that is demarcated by a plurality of division lines orthogonal to the row direction and can be placed at a position near the first side face by one division line or a plurality of division lines in the row direction, and
a second side face parallel portion that can be placed along the second side face over a portion of at least a half or more of the side length of the second side face,
during assembly, the second reinforcing portion includes,
a first side face near portion that is demarcated by a plurality of division lines orthogonal to the row direction and can be placed at a position near the first side face by one division line or a plurality of division lines in the row direction, and
a fourth side face parallel portion that can be placed along the fourth side face over a portion of at least a half or more of the side length of the fourth side face, and
the third reinforcing portion is configured to form a tubular portion or a U-shape portion with its opening facing downward as viewed from the side with one division line or a plurality of division lines in the row direction, and is placed along the third side face.

3. A collapsible toilet made from a rectangular board demarcated into five rows×three columns of rectangular segments by foldable division lines or perforation lines,
   the segments being formed to be bilaterally symmetric with respect to a line perpendicular to a row direction as a symmetry axis, the rectangular board being shaped into a rectangular parallelepiped when assembled, the toilet comprising:
   a first row section that forms a first side face;
   a second row section that is adjacent to the first row section and forms a top face;
   a third row section that is adjacent to the second row section and forms a third side face opposite to the first side face;
   a fourth row section that is adjacent to the third row section and forms at least a second side face, a fourth side face opposite to the second side face, and a bottom face; and
   a fifth row section that is adjacent to the fourth row section and forms a first reinforcing portion for the top face, a second reinforcing portion for the top face, and the first side face, wherein
   an opening is formed in the top face,
   during the assembly, the first reinforcing portion and the second reinforcing portion are each formed into a wave-shape portion by a plurality of division lines orthogonal to the row direction, and the first reinforcing portion and the second reinforcing portion can be placed along the second side face and the four side face, respectively, over the entire areas of the respective side faces,
   the second row section is formed of a center second segment and a right second segment and a left second segment placed with the center second segment interposed therebetween,
   at least one of the right second segment and the left second segment, and the center second segment are folded along a predetermined segment line and laid on top of each other, thereby forming the top face, and
   the one of the right second segment and the left second segment, and the center second segment have respective openings, and the openings are in communication with each other.

4. The collapsible toilet according to claim 3, wherein at least one of at least two openings in the second row section has foldable movement blocking pieces for the first reinforcing portion and the second reinforcing portion.

5. The collapsible toilet according to claim 3, wherein at least one of at least two openings in the second row section has foldable bag catch pieces.

* * * * *